Figure 1:
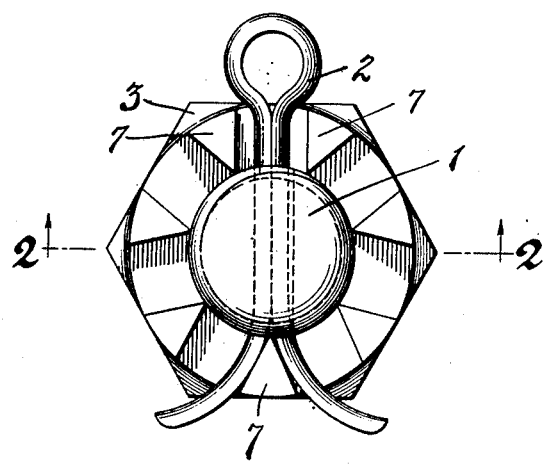

April 21, 1931.　　　　G. T. COOKE　　　　1,801,264

SAFETY NUT FOR SCREWS AND BOLTS

Filed Dec. 10, 1929

INVENTOR
George T. Cooke
BY
Mitchell Bechert
ATTORNEYS.

Patented Apr. 21, 1931

1,801,264

UNITED STATES PATENT OFFICE

GEORGE T. COOKE, OF SOUTH NORWALK, CONNECTICUT

SAFETY NUT FOR SCREWS AND BOLTS

Original application filed April 12, 1928, Serial No. 269,379. Divided and this application filed December 10, 1929. Serial No. 412,954.

This invention relates to certain new and useful improvements in bolts and nuts and consists primarily in the nut construction which is designed to be locked by a cotter pin in which the ends of the cotter pin are automatically opened or spread by the mere insertion of the same into its operative position. This application is a division of my former application for U. S. Letters Patent, Serial No. 269,379, filed April 12, 1928.

The main object of this invention is to provide simple and efficient means whereby a nut may have a wide range of adjustment with relation to the part which it is holding and be locked against turning on a bolt in its adjusted position by means of a cotter pin, which, upon the mere application of the same, has its ends automatically spread into holding position.

In the drawings—

Figure 2:
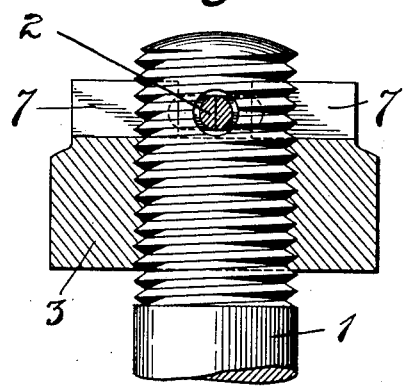

Fig. 1 is a plan view of my invention;
Fig. 2 is a section on the line 2—2 of Fig. 1.

Referring to that particular form of the invention shown in the drawings, 1 represents the end of a bolt having the usual cotter pin passage extending diametrically therethrough. 2 is a cotter pin. 3 is a nut having an even number of flat surfaces arranged around its periphery for receiving a wrench, whereby the nut may be screwed up tightly on the threaded end of the bolt 1 by means of such a tool. On the outer face of the nut are a series of wedges 7—7, the apex of each wedge being preferably located closely up to the edge of the bolt passage through the nut. These wedges are provided in an odd instead of an even number, and are so arranged that each wedge will face a radial passage between two corresponding wedges on the other side of the threaded passage through the nut, whereby a cotter pin 2 may be passed into the pin passage through the bolt so that when it emerges therefrom, its two ends will engage the apex of one of the wedges by which wedge said ends of the cotter pin will be automatically spread apart as indicated in Fig. 1, when the cotter pin is pushed or driven into place.

In operation, when the nut is screwed onto the bolt for the purpose of drawing up any device held thereby and it is desired to provide slight freedom, the operator may first screw the nut up as tightly as possible and then back it off to the point where the desired freedom is obtained, whereupon he is bound to find one of the radial passages in position or close to the position that will permit the cotter pin to be inserted and automatically spread by being driven in. By providing a screw-threaded body, such as a nut, with an odd number of radial passages and the corresponding number of wedges facing the same, twice the number of radial adjustments may be had per single turn as would be possible were said radial passages provided in an even number, as in the ordinary castellated nut well known in the art. For example, in the particular nut shown in the accompanying drawings, seven radial passages with seven pin spreading wedges coacting therewith are shown, and fourteen adjustments per a single turn are possible.

By the term "cotter pin" I mean to include any form of split pin capable of functioning for the purpose herein described. It should be understood that various modifications and changes may be made without departure from the scope of the appended claims.

What I claim is:

1. In a pin lock for a bolt and nut construction, a bolt having near its end a diametrical passage open at its ends only for receiving a cotter pin, a nut having an axial passage for said bolt, an odd number of radial passages in said nut forming between them an odd number of cotter pin spreading wedges, the apex of each spreading wedge facing one of said radial passages at the opposite side of said nut to force the two ends of a cotter pin apart and against the opposite side walls of said pin passage in said bolt when said pin ends emerge therefrom.

2. In a pin lock for a bolt and nut construction, a bolt having near its end a diametrical passage open at its ends only for receiving a cotter pin, a nut having an axial passage for said bolt, an odd number of radial passages in said nut forming between them an odd number of cotter pin spreading wedges, the apex of each spreading wedge facing one of said radial passages at the opposite side of said nut to force the two ends of a cotter pin apart and against the opposite side walls of said pin passage in said bolt when said pin ends emerge therefrom, the spreading edges of said wedges being substantially coincident with the wall of the bolt passage through said nut to thereby engage the cotter pin ends immediately upon their emergence from said passage.

GEORGE T. COOKE.